United States Patent [19]
Ghelfi et al.

[11] Patent Number: 5,536,699
[45] Date of Patent: Jul. 16, 1996

[54] PACKING HAVING CATALYTIC OR ABSORBENT AGENTS

[75] Inventors: Lorenzo Ghelfi, Uster; Jean P. Stringaro, Winterthur, both of Switzerland

[73] Assignee: Sulzer Chemtech AG, Winterthur, Switzerland

[21] Appl. No.: 278,303

[22] Filed: Jul. 21, 1994

[30] Foreign Application Priority Data

Aug. 26, 1993 [EP] European Pat. Off. ............... 93810612

[51] Int. Cl.$^6$ ............................. B01J 20/00; B01J 32/00
[52] U.S. Cl. ..................... 502/400; 502/439; 502/527
[58] Field of Search ........................... 502/2, 400, 439, 502/527, 215, 246; 261/94, 95, 96, DIG. 72

[56] References Cited

U.S. PATENT DOCUMENTS

| | | | |
|---|---|---|---|
| 4,163,724 | 8/1979 | Muller et al. | 210/323 |
| 4,443,559 | 4/1984 | Smith | 502/527 |
| 4,744,928 | 5/1988 | Meier | 261/95 |
| 5,032,156 | 7/1991 | Luder et al. | 55/269 |

FOREIGN PATENT DOCUMENTS

| | | |
|---|---|---|
| 0396650 | 11/1990 | European Pat. Off. . |
| WO90/0926 | 2/1990 | WIPO . |
| WO90/02603 | 3/1990 | WIPO . |

Primary Examiner—Shrive Beck
Assistant Examiner—Fred J. Parker
Attorney, Agent, or Firm—Townsend and Townsend and Crew

[57] ABSTRACT

The packing having catalytic or adsorbent agents, which is provided for at least one fluid medium, comprises packing elements (10) disposed in stacks, which are assembled from layers aligned along the main direction of flow (2). The layers are formed by packing parts (1), the walls (2) of which are permeable for the medium. The packing parts contain a catalyst material (3). Between the packing parts are provided flow ducts, which intersect and are open to one another. According to the invention the layers are formed by a plurality of packing parts (1), the packing elements (10) comprise support structures (4) into which the packing parts are inserted, and the packing parts are substantially cylindrical.

11 Claims, 2 Drawing Sheets

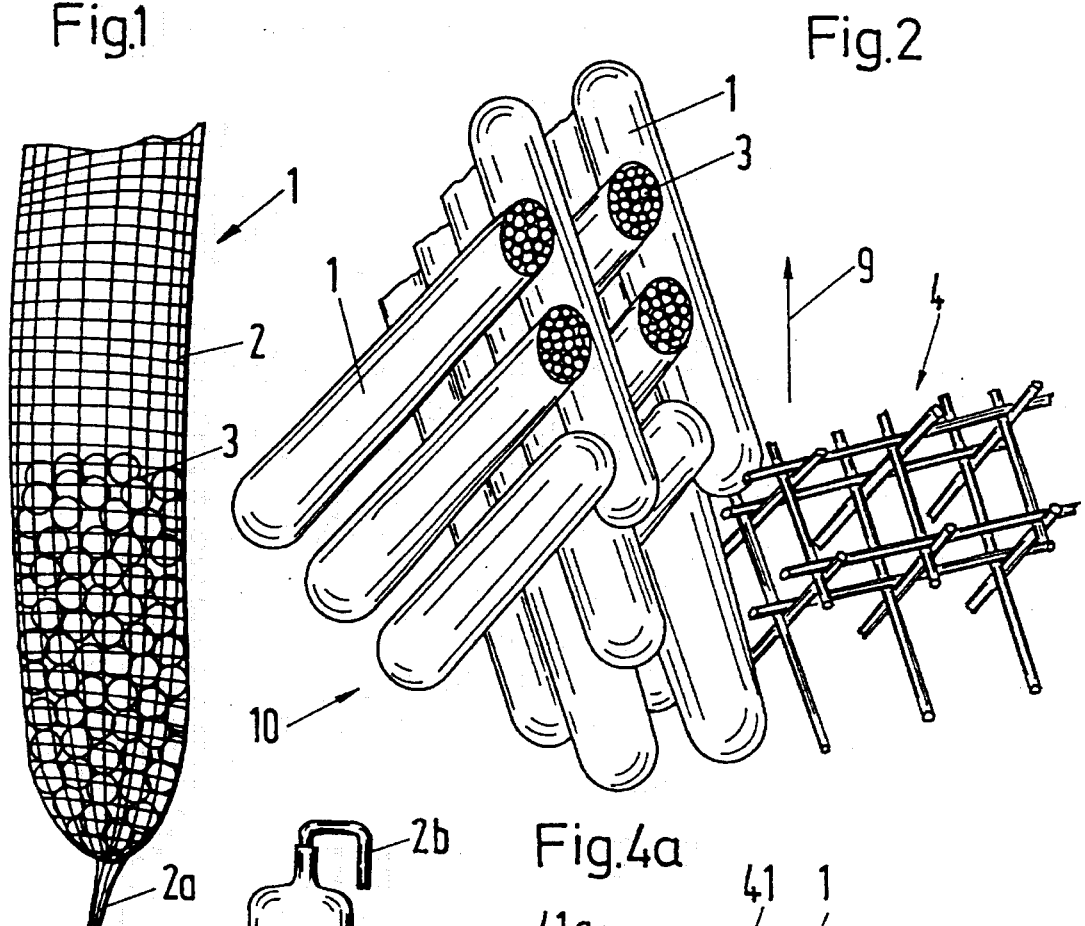
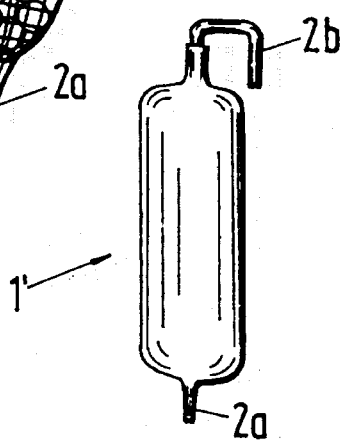
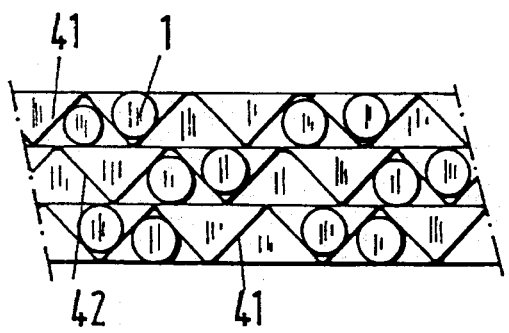
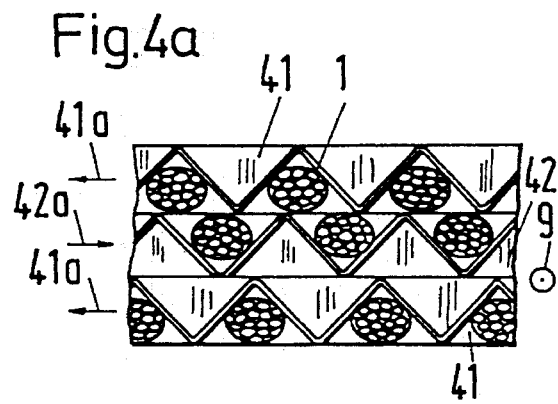
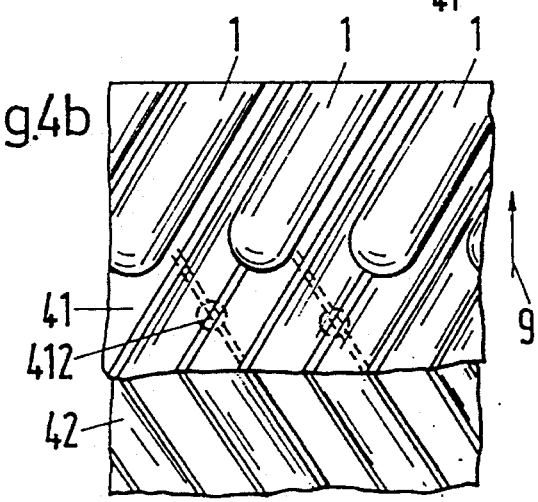

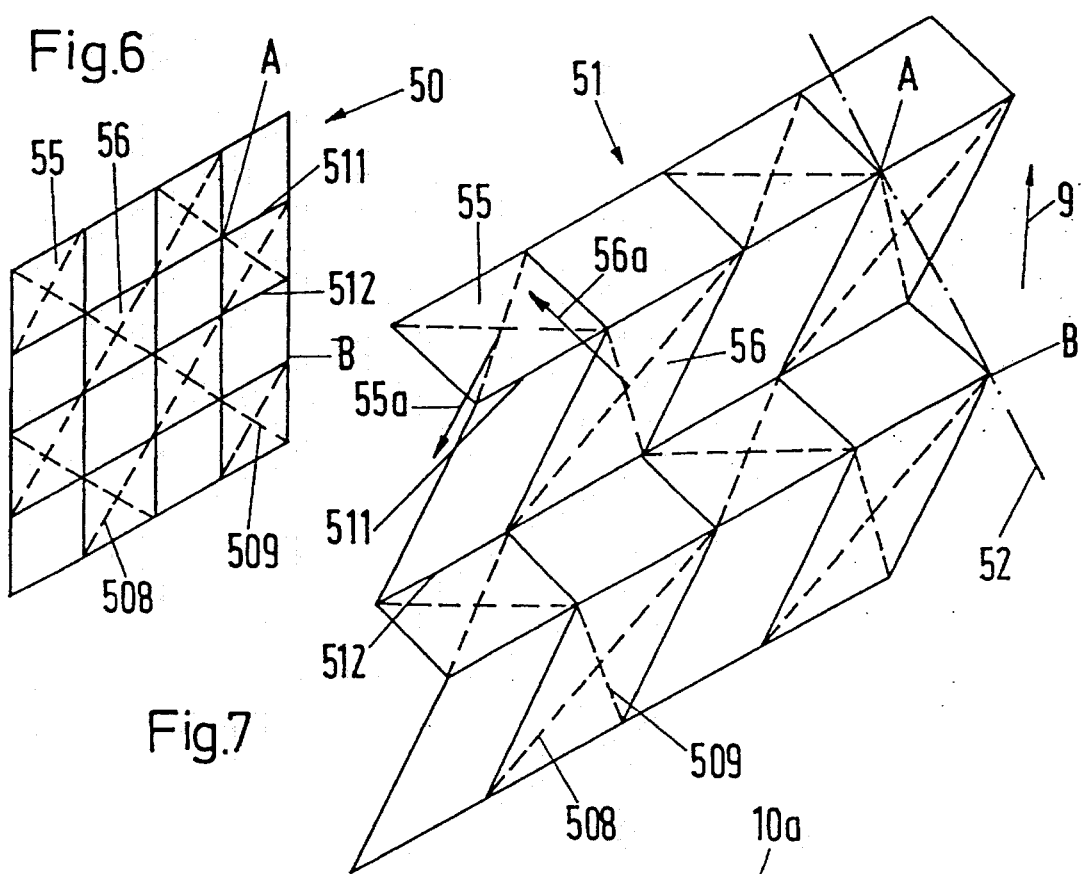
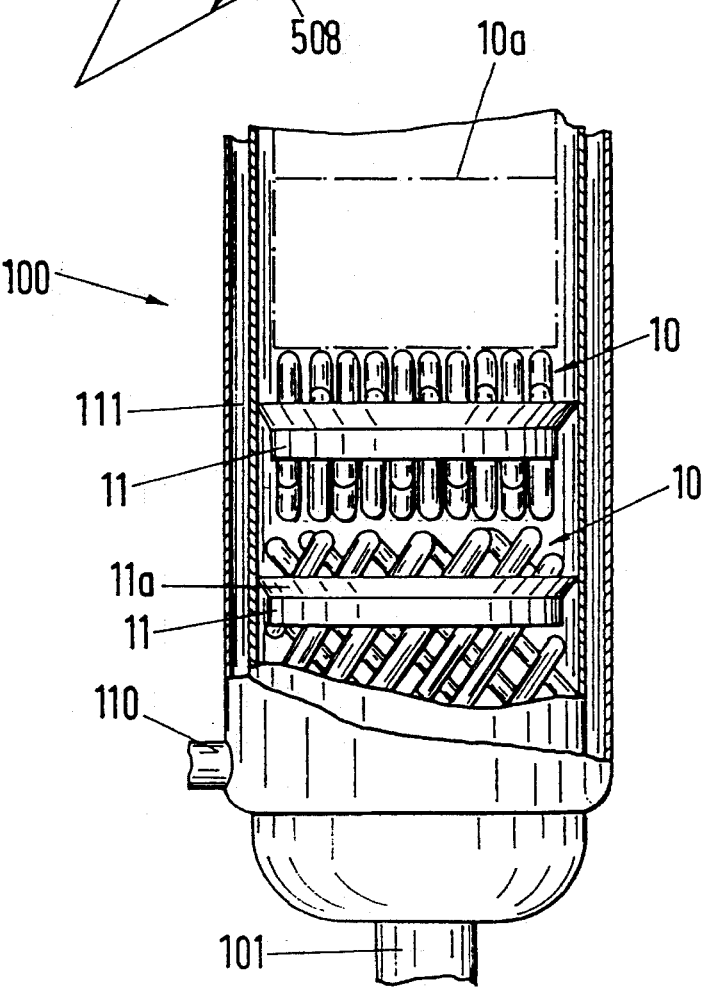

5,536,699

PACKING HAVING CATALYTIC OR ABSORBENT AGENTS

BACKGROUND OF THE INVENTION

The invention relates to a packing. Such devices are known from European Patent Specification 0 396 650 and European Patent Specification 0 367 717. The packing elements of the known devices comprise packing parts having double walls; between the double walls is inserted a catalyst material or an adsorbent material.

The flow ducts between the packing parts form a static mixer structure. Thanks to this mixture structure there is produced a temperature, velocity and concentration equalization over the column cross section which is advantageous for the reaction. Furthermore the fact that pressure drops are relatively slight is advantageous.

A disadvantage of the known device is that the packing parts have to have a mechanical stability so that the packing elements can be stacked one on top of the other, and so that at the same time the structure of the packing parts has to produce a system of flow ducts. Furthermore the packing parts have to retain their predetermined shape when they are filled with the catalyst and adsorption material.

SUMMARY OF THE INVENTION

It is object of the present invention to develop further the known device so that it is easier to meet the requirements for the structure of the packing parts. A packing element should also be constructed so that the packing parts can be easily exchanged.

This object is achieved by forming layers with a plurality of packing parts, providing support structures into which the packing parts are inserted, and making the packing parts substantially cylindrical. Here by cylindrical shape is understood a shape which can be produced from any plane (e.g. a "triangle" without rounded corners) by parallel displacement along the normal of the plane.

The invention also relates to uses of this packing, i.e. the application to a catalytic distillation process (cf. European Patent Specification 0 396 650), for the production, for example, of MTDE (methyl tertiary butyl ether), ETBE (ethyl tertiary butyl ether) or TAME (tertiary amyl methyl ether), or the application to adsorption processes.

If the packing according to the invention is provided for two fluid phases, for example a gaseous and a liquid phase, the two phases can be performed both in the counter-flow and also in the co-current flow. The two phases may also both be liquid, if they cannot be mixed and have different densities. A reactor having the packing according to the invention may for example also be a sludge bed column or a bubble column.

BRIEF DESCRIPTION OF THE DRAWING

FIG. 1 is a partial detail of a lower zone of a packing part made according to the invention, FIG. 2 is a detail partially in section, a packing element and an associated support structure, FIG. 3 shows a second packing part, FIG. 4a is a cross-sectional detail through a packing element having a second support structure, FIG. 4b is a side view of the packing element shown in FIG. 4a, which is opened along a layer, FIG. 5 is a variant of the packing element shown in FIG. 4a, FIG. 6 shows a plane grid having rhombic joint faces, FIG. 7 shows the grid in FIG. 6 folded zig-zag fashion, and FIG. 8 is a detailed longitudinal section through a reactor made according to the invention.

DESCRIPTION OF THE PREFERRED EMBODIMENTS

Referring to FIG. 1, a packing part 1 consists of a stocking-type packing drum 2, which comprises a lower closed part 2a and which is partly filled with a catalyst granulate 3. The wall of the packing part 1 is advantageously a braided or knitted fabric made from a thin metal wire (wire diameter approximately 0.1 to 0.2 mm). This packing drum 2 does not achieve a certain dimensional stability until it is filled with the bulky catalyst material. Packing part 1 is for example cigar-shaped and comprises at least an approximately circular cross section. However it may also have a cylindrical shape with, for example, an oval cross section. Other cross-sectional shapes are also possible.

A vibrating device is helpful for filling the packing part 1 with catalyst material 3. It is advantageous to close the packing drum 2 after filling at the top with a clamp (not represented) or another connecting means. This connecting means should be easy to remove and replace, so that, when it is necessary to exchange the catalyst or adsorption material, the packing part 1 can be easily emptied and thus is easy to reuse.

The filled and closed packing part 1 is inserted into a support structure 4—see FIG. 2. A plurality of packing parts 1 forms a packing element 10. In FIG. 2 for the sake of clarity on the right-hand side only a detail of the support structure 4 is represented and on the left-hand side the arrangement of the packing parts 1 is represented. This arrangement essentially provides a static mixture structure, as is known from European Patent Specification 0 070 917.

The packing element 10 is assembled from packing parts 1 which are arranged in layers which are parallel to the main flow direction of flow 9. Between the packing parts 1 are located flow ducts, which are inclined in relation to the main direction of flow 9, which intersect and which are open to one another.

A structure having strip-shaped parts known from European Patent Specification 0 070 917 is suitable, for example, as a support structure for the packing parts 1. FIG. 2 shows a support structure 4 which has the form of a three-dimensional lattice. This lattice is constructed from rods or wires, which are interconnected at the intersection points. The support structure 4 comprises ducts, into which the packing parts 1 can be inserted. The packing parts 1 advantageously include means for suspending them in the support structure (4), e.g. a hook 2b at the upper end—see FIG. 3.

The packing parts 1 partly have different lengths (cf. FIG. 2). In order to enable a uniform length, short packing parts 1' can also be provided (see FIG. 3); in this case in the long ducts of the support structure 4 two or more packing parts 1' are disposed in a line one behind the other. The ducts of the support structure 4 may partly remain empty or be only partially filled with packing parts 1 and 1'.

Packings of surfaces folded in a wave-fashion or a zig-zag fashion as static mixer structures are known (see for example German Patent Specification 27 22 424). Such mixer structures can also be used as support structures. An example is shown in FIGS. 4a (view towards the main direction of flow 9) and 4b (view perpendicular to the main direction of flow 9). Wavy surfaces 41 and 42, which comprise contact points 412 at the summits, form a structure having intersecting ducts. Arrows 41a and 42a indicate the inclination directions of the ducts. In the example shown in FIG. 4a, the ducts between adjacent surfaces 41 and 42 are alternately filled and not filled with packing parts 1. As FIG. 4b shows, the ducts in the present example are only partially filled. Another arrangement of the packing parts 1 is shown in FIG. 5. Further arrangements, which are not represented, are also possible. For example, it is possible to fill all ducts with packing parts 1.

"Vortex packings", which are known from European Patent Specification 0 221 095 and WO 90/10497, are also suitable as further support structures. The packing which is described in the second document mentioned can also be produced by zig-zag surfaces. In this case the individual surface comprises rhombic faces which are arranged like a chess board, in which case some faces are constructed as apertures. FIGS. 6 and 7 can be used as illustrations. The plane, grid-type surface 50 in FIG. 6, which is a detail of a larger surface, is converted by bending along lines 511, 512 into the folded surface 51 of FIG. 7. The rhombic joint faces 55, 56, the diagonals 508 and 509 of which are indicated by broken lines, can be regarded as closed joint faces of the vortex packing. A second folded surface, which is not represented, is disposed adjacent to the surface 51; in this case the folded edges of this second surface extend in the direction of the straight lines 52 indicated by dot-dash lines. The two points A and B, which lie on the straight line 52, represent points of contact between the two folded faces. The vortex packing is produced by the further attachment of corresponding surfaces.

The known vortex packing is suitable as the support structure for the packing element made according to the invention. However it is also possible to provide a three-dimensional lattice corresponding to this packing, the bars of which are disposed in layers as shown by the unbroken edges of the faces of surface 51, FIG. 7. The packing parts 1 can be inserted into the ducts produced by folding (="first duct system").

The vortex packing has the property of symmetry that after a 90° rotation about an axis which is parallel to the main direction of flow 9, the structure again displays the original arrangement of open and closed joint surfaces. In other words, there is a second system of intersecting ducts, which extend at right angles to the ducts of the first duct system, i.e. in the direction of arrows 55a and 56a. The packing parts 1 can also be inserted into these transversely extending ducts. If the support structure is composed of lattice-like layers, corresponding to the surface 51 in FIG. 7, the transversely inserted packing parts exert an effect which reinforces the packing element.

FIG. 8 shows the lower part of a reactor 100 (having a circular cross-section) having a packing made according to the invention, in which the packing elements 10 are disposed in stacks. Adjacent packing elements are offset by an angle of 90°. The upper packing elements are indicated by dot-dash edge lines 10a. A collar 11 having lobed protrusions 11a surrounds a packing element 10. The connection piece 101 is provided for the supply or discharge of the fluid medium. The dissipation of reaction heat may be performed via a cooling shell 111 (cooling medium connection piece 110).

European Patent Specification 0 396 650 discloses the use of catalytic solutions or fluid catalyst materials. This is also possible for the reactor described here, if for example the walls of the packing parts are constructed as double layers, so that one layer consists of a liquid-tight membrane permeable for the fluid medium and the other layer forms a perforated support structure.

What is claimed is:

1. A packing for placement in an elongated container having an inlet and an outlet for a fluid medium flowing in an axial direction through the container, the packing comprising first and second adjacent layers which are parallel to the flow direction of the fluid medium and extend over at least a portion of the length of the container, each layer including a plurality of parallel, spaced-apart, tubular, elongated packing parts which are angularly inclined relative to the flow direction, the packing parts of the first layer being angularly inclined relative to the packing parts of the second layer to define first and second flow channels in the first and second layers which are angularly inclined with respect to each other and to the flow direction and which are fluidly interconnected, each packing part comprising a fluid medium permeable fabric having closed sides and ends and holding therein a catalytic or adsorbent material for contacting the fluid medium, and having a support structure which orients and supports the packing parts of the first and second layers in their respective positions and angular orientations.

2. A packing according to claim 1 wherein the catalyst or adsorption material comprises a bulky granulate.

3. A packing according to claim 1 wherein the packing parts are made from one of wire braid and knitted wire cloth.

4. A packing according to claim 1 wherein the support structure comprises a three-dimensional lattice.

5. A packing according to claim 1 wherein the support structure comprises a static mixer structure for the fluid medium.

6. A packing according to claim 4 wherein the support structure comprises a zig-zag folded sheet which includes spaced-apart openings.

7. A packing according to claim 1 wherein the packing parts comprise means for suspending them in the support structure.

8. A packing according to claim 1 wherein the support structure comprises ducts, and wherein at least two packing parts are disposed one behind the other in at least some individual ducts.

9. A packing according to claim 1 wherein the catalyst material is a liquid, and including a membrane placed against a side of each layer facing the other layer, the membrane being impermeable by the liquid and permeable by the fluid medium, each membrane being sealed to the other and the liquid catalyst being disposed between the membranes, the layers forming a fluid permeable support structure for the membranes.

10. A column for treating a fluid medium comprising a tubular, elongated container having an inlet and an outlet for a fluid medium flowing in an axial direction through the container, at least one packing disposed in the container including first and second adjacent layers which are parallel to the flow direction of the fluid medium and extend over a portion of the length of the container, each layer including a plurality of parallel, spaced-apart, tubular, elongated packing parts which are angularly inclined relative to the flow direction, the packing parts of the first layer being angularly inclined relative to the packing parts of the second layer to define first and second flow channels in the first and second layers which are angularly inclined with respect to each other and to the flow direction, the flow channels of each layer being fluidly separated from each other by a packing part and having means for fluidly interconnecting selected flow channels of the first and second layers, each packing part comprising a fluid medium permeable fabric having closed sides and closed ends and holding therein a catalytic or adsorbent material for contacting the fluid medium, and having a support structure permitting fluid flow between the selected flow channels in the first and second layers and which orients and carries the packing parts of the first and second layers in their respective positions and angular orientations.

11. A column according to claim 10 including a plurality of packings serially arranged in the housing.

* * * * *